United States Patent

Maurice et al.

[11] Patent Number: 6,005,510
[45] Date of Patent: Dec. 21, 1999

[54] METHOD FOR THE PROCESSING OF MULTIPLE PATHS

[75] Inventors: Alain Maurice, Asnieres; Christian Fleury; Jean-Noël Rozec, both of Laval, all of France

[73] Assignee: Thomson-CSF, Paris, France

[21] Appl. No.: 09/146,172

[22] Filed: Sep. 3, 1998

[51] Int. Cl.$^6$ .................................................. G01S 13/78
[52] U.S. Cl. ............................. 342/45; 342/148; 342/40
[58] Field of Search ................................. 342/45, 40, 42, 342/43, 148

[56] References Cited

U.S. PATENT DOCUMENTS

| | | | |
|---|---|---|---|
| 3,665,464 | 5/1972 | Meilander | 342/36 |
| 4,128,839 | 12/1978 | McComas | 342/32 |
| 5,063,386 | 11/1991 | Bourdeau et al. | 342/40 |
| 5,448,643 | 9/1995 | Parker | 380/59 |
| 5,463,398 | 10/1995 | Young | 342/46 |
| 5,528,244 | 6/1996 | Schwab | 342/37 |

*Primary Examiner*—John B. Sotomayor
*Attorney, Agent, or Firm*—Oblon, Spivak, McClelland, Maier & Neustadt, P.C.

[57] ABSTRACT

The invention relates to the processing of the multiple paths in an interrogator station which, in response to a salvo of interrogations, receives responses in the form of pulses. The station comprises at least two reception channels. The responses to each interrogation of one and the same salvo are classified by order of appearance. A value of dispersion of the energies is estimated, for each channel and each salvo, on the responses having the same classification. Since the first classified response is, by assumption, considered to have arrived by a direct path, the following responses will be eliminated, on the grounds that they have been received after passing through multiple paths, if their values of dispersion of energy on the two paths are not equivalent to those of the first response.

3 Claims, 2 Drawing Sheets

METHOD FOR THE PROCESSING OF MULTIPLE PATHS

BACKGROUND OF THE INVENTION

The present invention relates to the processing of multiple paths in radars, altimeters, and IFF (identification friend or foe) transceivers. The present invention falls more specifically within the framework of reception with an antenna having at least two reception channels.

The problem is to eliminate the echo signals, i.e. the signals obtained by multiple paths, so as to preserve only the signals received on a direct line, known as direct signals. Various techniques are known for this purpose.

The least expensive, but also the least efficient, of these known techniques consists in making the receiver <<blind>> as soon as a signal has been received, and in doing so for a predetermined length of time. However, this technique is not applicable if the various signals received are close to one other.

A second technique consists in exploiting a Doppler coherence when each transmission and reception device permits it. The coherence of the evolution of the phase of the electromagnetic pulse signal in subcarrier terms is measured during the repetition of the recurrences of transmission. The amplitude and phase measurements of the signals present after detection then result in the discriminating of the echoes, i.e. the indirect signals, as a function of the spectral spread. However, while this technique can be used for example in coherent Doppler radar, it cannot be used with IFF transmitters where it lacks a phase reference.

A third technique that is even better than the second one consists in eliminating the indirect signals by the method known as the complex angle method. However this technique, which requires three reception channels to give good results, is expensive.

SUMMARY OF THE INVENTION

The goal of the present invention is to propose a technique that is less costly to implement than the above-mentioned third technique, but is quite as efficient as the second one.

This is obtained, for a process according to the second technique, by a search for coherence, but without any notion of phase.

According to the invention, there is provided a method for the processing of the multiple paths in a transceiver station designed to send salvoes of recurrent interrogations and, following a given interrogation, to receive responses in the form of elements, formed by at least one pulse, on n distinct channels, with n as an integer greater than 1, during a given period of time, called a recurrence, whose point of origin in time is the instant of transmission of the given interrogation and whose duration is the time interval between two successive interrogations in the salvo, this method consisting, in relation to each salvo, in considering only the recurrences where each received element is identified without ambiguity, selecting only the first of the recurrences and, among the following recurrences, only those having the same number of elements as the first recurrence, carrying out a classification, by order of appearance, of the elements in the recurrences selected, taking a measurement of the energy of each element related to the total duration of the pulses of the element, computing a normalized variance type of dispersion of the energy values on all the elements having the same classification, and doing so for each channel, and comparing the dispersion values so as to consider, as valid, only the first element of the classification and, among the other elements of the classification, only those which, on all the n channels, have dispersion values similar to those of the first one.

BRIEF DESCRIPTION OF THE DRAWINGS

The present invention will be understood clearly and other characteristics will appear from the following description and from the appended drawings, of which.

MORE DETAILED DESCRIPTION

Figure 1:
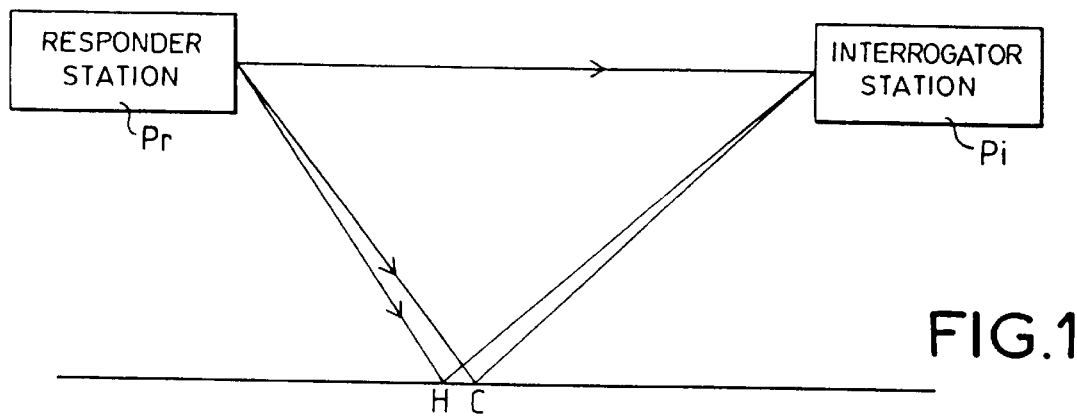
FIG. 1 is a diagrammatic view of an IFF operation with a direct RF path and a reflected RF path.

FIG. 1 shows an interrogator station Pi and a responder station Pr of an IFF system, at the time when the responder station sends a response to an interrogation that it has just received from the interrogator station. It is assumed that the response arrives at the receiver station along two RF paths: a direct path and a reflected path which shall be called an indirect path. However it turns out to be the case that an indirect path is formed with several individual reflecting elements and that <<the source>> of the indirect path is in fact a set of reflecting points. In the case of FIG. 1, it has been assumed that this set of points is located on the ground and is reduced to two points H and C.

Figure 2A:
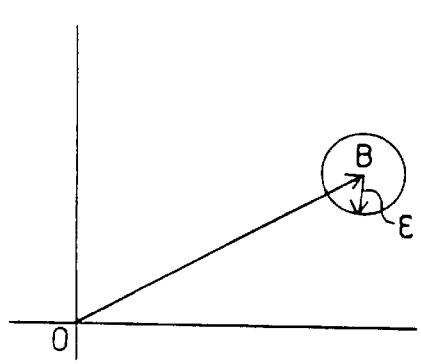
FIGS. 2a and 2b are vector representations relating to the direct and reflected paths of FIG. 1.
Figure 2B:
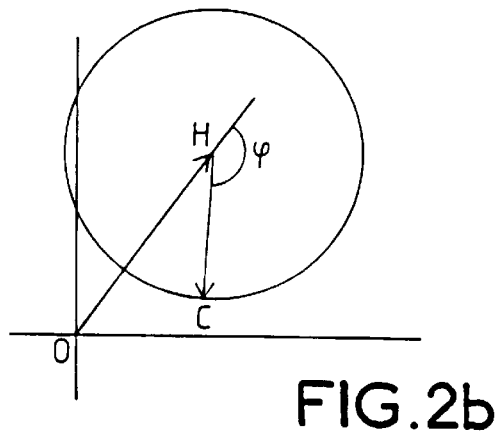

The FIGS. 2a and 2b provide a view, in the Fresnel plane, of the energy elements collected by the interrogator station Pi, respectively for the direct path and for the indirect path. It must be noted that the thermal noise specific to the station plays a part in these energy elements obtained by the sampling of the collected signal.

In the case of the direct path, as seen in FIG. 2a, the energy element is the sum of a useful energy value, OB, and an energy value $\epsilon$, representing the thermal noise; the latter energy may be considered to be a centered Gaussian component with an amplitude that comes under a system of stationary statistics for which any mathematical estimator, such as a variance, converges towards a borderline central value when the number of measurements, and hence the width of the measurement window, increases.

In the case of the indirect path it can be seen, without even taking account of the thermal noise specific to the receiver, that the contributions of the various reflecting points, such as H and C, to the energy element of the indirect signal are two useful energy values, OH, HC, but phase-shifted by an angle $\phi$ with respect to each other. The term 'useful energy' must be understood to mean energy that is carrying expected information. The phase-shift $\phi$ is a function of the variations, in particular of the positions of the reflecting elements with respect to one another, i.e. it is a function of the mechanical disturbances. Thus, the variation of $\phi$ during one window is different from the variation during another window, and this is so in a way that is <<random, variable in time>> so that, whatever the width of the measurement window, the result that will be provided by a mathematical estimator such as a variance will depend on the point in time chosen to open the window. This dependence relates to non-stationary statistics.

It is this difference in constitution between the direct signal and the indirect signal that is put to profitable use here below to eliminate the parasitic signals, i.e. the indirect signals, by calculating the dispersion of the measurement data with a mathematical estimator and by comparing the results obtained with one another. Since the first signal received is, by assumption, a direct signal, it is used as a reference for the following signals, and so on and so forth for each salvo of interrogation signals.

The exemplary embodiment that shall be described pertains to IFF signals but can be very easily be transposed to the technique of radar signals. In this example, the IFF signals to be processed are signals transmitted in response to salvoes of 16 interrogations regularly separated by 2.5 ms. And these signals are made up of information elements with a 50 µs duration comprising pulses or bits that form a preliminary protocol or header, followed by 16 positions in each of which there may be a pulse, the pulses contained in these 16 positions constituting the information proper. In the receiver of the interrogator station the 16 recurrences formed by the intervals of 2.5 ms that follow each interrogation are sampled at 4 MHz to define 5,000 distances slots in one recurrence, starting from the instant of interrogation relating to the recurrence considered.

The interrogator station Pi referred to further above is a transceiver station whose reception part comprises two antennas connected by an adder to a sum channel and by a subtractor to a difference channel.

Let $a1(t)$ be the amplitude integrated for a time To at least twice as small as the duration of the pulses contained in the signal received on the sum channel and let $a2(t)$ be the corresponding amplitude for the signal of the difference channel.

Figure 3:
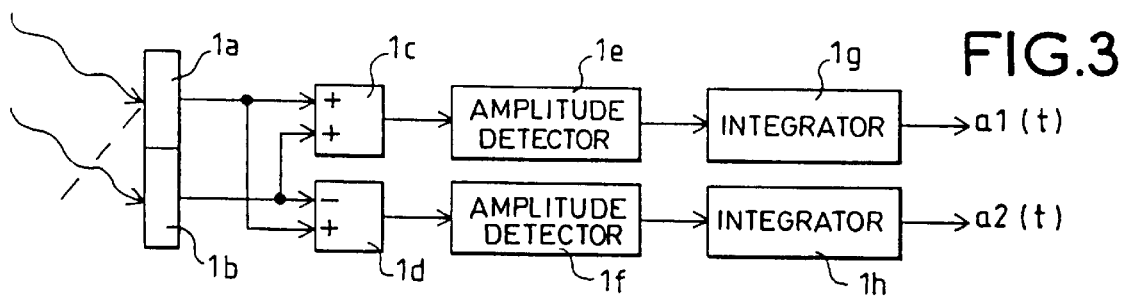
FIG. 3 is an electrical diagram of a circuit whose output signals can be processed according to the invention.
Figure 4:
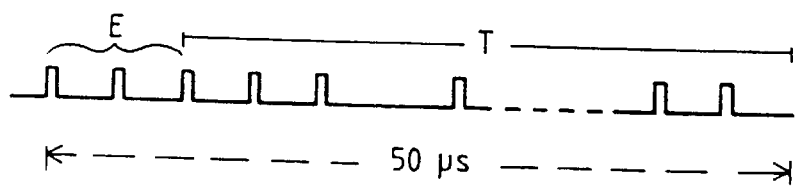
FIG. 4 is a timing diagram relating to a signal to be processed according to the invention.

This first processing operation, which consists of a detection of the contents of the signals picked up, is performed by an input circuit shown in detail in FIG. 3. The input circuit comprises two input sensors $1a$, $1b$ which are two slotted antennas of an IFF transceiver. These sensors receive a wave in a horizontal plane, i.e. in azimuth. The angle of incidence of this wave on the sensors determines a shift with respect to the instants of their respective reception of one and the same signal with a wavelength λ. They respectively give two signals $v1(t)$ and $v2(t)$ which are added in an adder $1c$ and subtracted in a subtractor $1d$ to give the sum and difference channels. These signals of the sum and difference channels are processed conventionally in an effective amplitude detector $1e$, if followed by an integrator $1g$, $1h$ to provide the information signal $a1(t)$, $a2(t)$ as contained in the sum and difference channels. With respect to the integrators $1g$, $1h$ it is recalled that they carry out an integration which, for example for $a1(t)$, can be written as follows $$a1(t) = \frac{1}{To}\int_{t-To}^{t} |v1(x) + v2(x)| dx$$

where T is the time, To is a period at least twice as small as the duration of the information bits, i.e. the pulses, in the collected signal, and $|v1(x)+v2(x)|$ is the amplitude of the information in the subcarrier on the sum channel, i.e. also the amplitude of the information in baseband on the sum channel. The signals $a1$ and $a2$ are made up, in the example described, of elements with a 50 µs duration, with a header E formed by pulses, followed by a train T of 16 pulses that are present or absent. FIG. 4 is a timing diagram of such an element. In fact this diagram does not depict the background noise that accompanies the pulses of the element.

Figure 5:
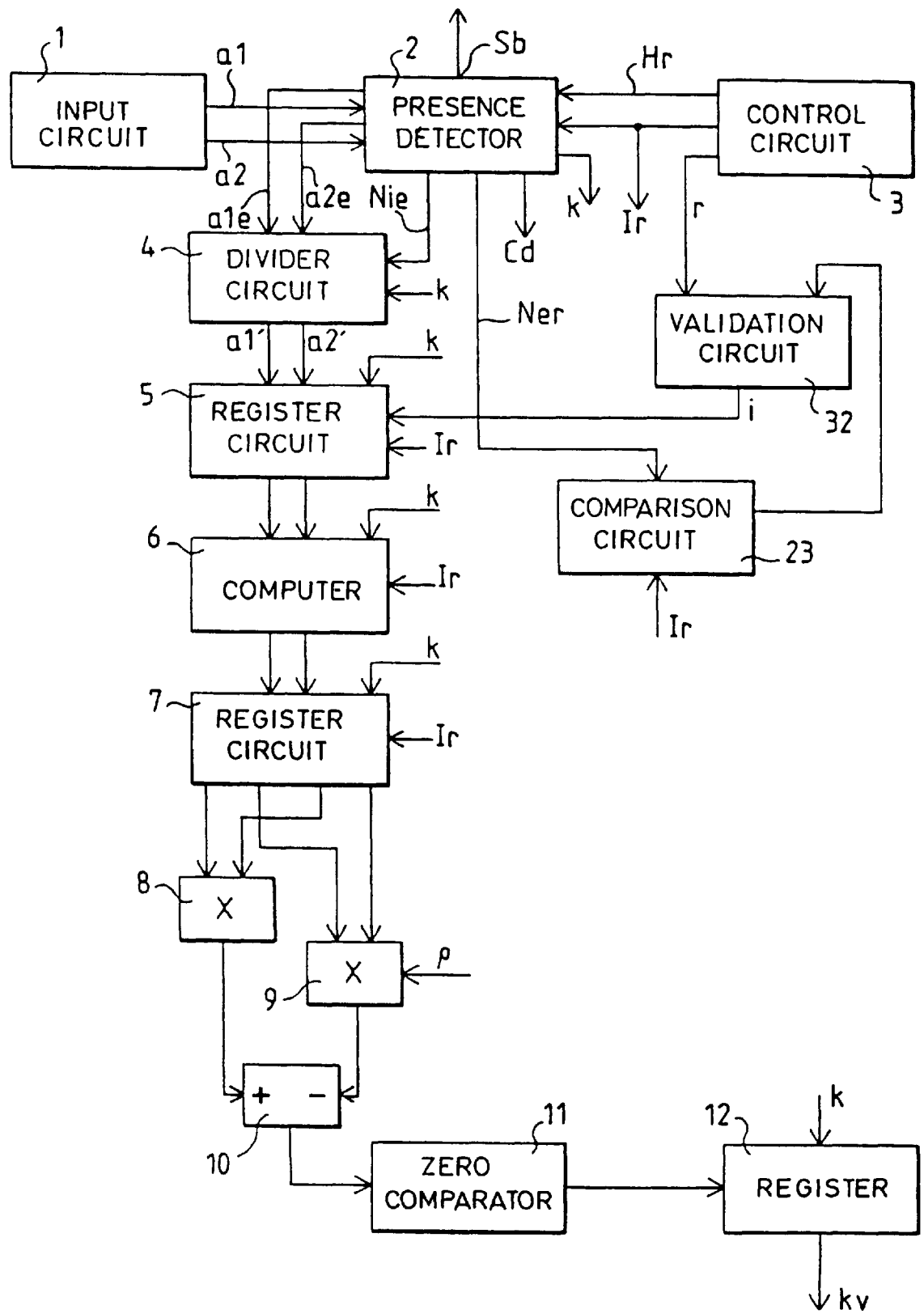
FIG. 5 is an electrical diagram of a processing device according to the invention.

FIG. 5 is an overall view of a device for the processing of multiple paths according to the invention. In this figure, the precise synchronization device, which is a part of current technology, has not been shown in order to make the drawing clearer and simplify the explanation. In FIG. 5, a rectangle 1 represents the input circuit which has been described with reference to FIG. 3 and provides the signals $a1$, $a2$ of the sum and difference channels.

A presence detector 2 rids the signals $a1$, $a2$ of their background noise by means of a threshold circuit whose threshold value develops proportionally to the amplitude of the received pulses. This threshold circuit is a constant false alarm receiver or CFAR. This type of receiver described in particular in J. Darricau, "Physique et theorie du radar" (Physics and Theory of Radar), Sodipe, 3rd edition, 1994, Vol. 3, Chapter 9, para 3. The signals which are rid of their background noise are used in the presence detector. The presence detector 2, in addition to its role of background noise eliminator, has several other functions.

The presence detector 2 recognizes the instants at which the headers of the elements appear in each recurrence and delivers values Cd which are the range bins in which elements in each recurrence are recognized. In fact, the values Cd are delivered only for the valid recurrences. A recurrence is said to be valid if there is no ambiguity with respect to the identification of the elements that it contains, i.e. if there is not at least partial overlapping between two of its elements, it being understood that the pulses of two elements can be interlaced without there being a risk of overlapping. The risk of overlapping is understood as a risk of total overlapping of the pulses. Thus, in each element, since the distance between the possible positions for two successive pulses is 2 µs, the risk of there being overlapping when two elements are interlaced is 0.5/2=¼, considering that the sampling defines range bins at 2.5 ms/5000=0.5 µs. For each value Cd delivered in a recurrence, the detector 2 also delivers a sequence number k=1, 2, 3 . . . corresponding to the order of appearance of the elements in each valid recurrence.

A particular embodiment of the means of detecting the instants when a presence of an element is recognized is described in the pulse duration discriminator referred to in paragraph 2.3.3 of chapter 19 of the book already mentioned here above.

The presence detector 2 delivers, on an output Sb, for each of the values k, the numerical values i.e. the bits represented by the 16 pulses which, it has been seen, constitute the information proper.

The presence detector 2 counts the number of pulses per element and the number of elements per recurrence and delivers a signal representing the number $N_{ie}$ of pulses in an element of a valid recurrence and a signal representing the number $N_{er}$ of valid elements per recurrence. For the non-valid recurrences, $N_{ie}$ and $N_{er}$ have the value 0.

The presence detector 2 comprises integration circuits for the performance, with respect to each element of a valid recurrence, of an integration for the duration of the element i.e. for the determining of the total energy contained in the pulses of the element considered. The signals relating to these energy levels of the elements in the sum channel and in the difference channel are referenced $a1_e$ and $a2_e$ respectively in FIG. 3; they are sent on a divider circuit 4.

A control circuit 3 delivers an interrogation signal Ir, i.e. a signal to release a salvo of 16 interrogations that define the 16 recurrences referred to here above; it also delivers a signal Hr which is the 4 MHz sampling signal and a signal R for each of the 16 valid or non-valid recurrences of a salvo.

A comparison circuit 23, re-initialized at each interrogation signal Ir, receives the signal $N_{er}$ representing the number of elements per valid recurrence, from the detector 2, stores the number $N_{er}$ relating to the first valid recurrence of a salvo and compares the numbers relating to the various valid recurrences in the salvo considered with this number. If the comparison shows that there is equality between the two numbers, the recurrence is validated by means of a validation circuit 32 which receives the signal R and, as a validation signal, the output signal of the circuit 23. The circuit 32 delivers a signal which is the i order number of the valid and validated recurrences in a salvo. It can take the values 1, 2, 3 . . . , 16.

The following part of the processing of the signals received in response to an interrogation salvo will consist, initially, in estimating the dispersion of the measurement data for the elements carrying the same order i number in the validated recurrences of the same salvo. Then, given that the first element of a recurrence (k=1) is valid since this element was the first to be received and therefore corresponds to a direct path, the processing operation consists, in the second stage, in validating it and in using it as a reference, by comparing the results of the estimate for the k=1 order elements of a salvo with the results for k=2, 3 . . . , this being the case only with the elements taken in the validated recurrences i. This comparison makes it possible to eliminate the same order k elements in a salvo when the dispersion is not appreciably equivalent to that of the k=1 order elements and to validate those where the dispersion is appreciably equivalent. As soon as an element is validated, for example the element for k=4, it is this new validated element that is used as a reference for the comparison with the k=5, 6 . . . order elements, and this is so until the possible validation of a new element relating to the salvo considered.

For this purpose, a divider circuit 4 carries out a preliminary standardization of the energy levels of each signal $a1_e$ and $a2_e$, so that these levels are not dependent on the number of pulses contained in the element considered. This standardization consists, for each element, in dividing the value of the energy level by the number of pulses contained in the element considered.

The normalized energy level signals of the elements of the sum and difference channels are referenced a1' and a2' in FIG. 3.

The normalized values are stored in a circuit 5 with registers inasmuch as they come from elements contained in validated recurrences i. For this storage, which is carried out separately for the sum channel and the difference channel, at each salvo, the various normalized energy level values corresponding to one and the same value k in the validated recurrences i are introduced into registers of the circuit 5. This is done for each value of k.

Let $a_1, a_2 \ldots , a_n$ be the values of the energy levels contained in any one of the registers, of the circuit 5, in relation to a given salvo. It should be noted that n is the number of validated recurrences in relation to the given salvo.

For each of the registers of the circuit 5 at the time of each salvo, a computer 6 computes:

the mean value of the contents of the register considered $$M(a_j) = \frac{1}{n}\sum_{j=1}^{n} a_j$$

an operator A for the estimation of the dispersion values of the energy levels contained in the register considered; in the example described, this operator is the normalized variance $V(a_j)/[M(a_j)]^2$ with $$V(a_j) = \frac{1}{n}\left[\sum_{j=1}^{n} (a_j)^2\right] - [M(a_j)]^2$$

another possibility of an operator is the normalized standard deviation $\sigma(a_j)/M(a_j)$ with $\sigma(a_j)=\sqrt{V(a_j)}$ these normalized values constitute operators that represent energy dispersion values while being insensitive to the energy levels.

Let A1(k) and A2(k) be the operators, relating to the sum channel and the difference channel, for a given k order. The study of the values of these operators, even when the number of valid recurrences is relatively small in a given salvo, makes it possible to observe that:

for the direct paths, A1(k) and A2(k) have relatively constant values from one direct path to the next, for the multiple paths, at least one of the operators A1(k), A2(k) attains values clearly higher than those that are attained for the direct paths.

The determining of the multiple paths is based on this observation: elements in which at least one of the operators has a value greater than the values usually obtained with the direct paths shall be regarded as coming from multiple paths and therefore eliminated. It is understood that since, as was seen earlier, the first element in a reference, i.e. the element for k=1, is obtained directly, its operators A1(k=1) and A2(k=1) can be used as reference values in a comparison with the operators relating to the following elements, and that this can be so until a new element is found relating to a direct path i.e. an element for which the two operators have values appreciably equivalent to those of the first element; the values of the operators of this new element are then used as a reference until another element is found relating to a direct path and so on and so forth until the last valid element of the salvo considered.

To make these comparisons, various procedures are conceivable. It we consider, for example, the operators A1(k=2), A2(k=2) to be compared with the operators A1(k=1), A2(k=1), it is possible to:

a) make separate comparisons of A1(k=2) with A1(k=1) and A2(k=2) with A2(k=1) and consider that the element for k=2 has been received by a multiple path and therefore must be eliminated if at least one of the two inequalities hereinafter is verified:

A1(k=2)>ρ.A1(k=1)

A2(k=2)>ρ.A2(k=1)

Here and further below, ρ is an adjustment parameter, very close to one or equal to one, that can be determined by successive tests with various values of ρ, during tests of the hardware or by the study of the values obtained for the operators A1(k), A2(k). The values of ρ slightly lower than 1 increase the security of the processing by decreasing the risk that wrong responses, i.e. responses coming from multiple paths, may be taken into account. The values slightly greater than 1 decrease the security but prevent elements received by direct paths from being eliminated. In case of doubt ρ can thus quite simply be taken to be equal to 1.

b) verify the inequality:

A1(k=2)+A2(k=2)>ρ[A1(k=1)+A2(k=1)]

c) verify the inequality:

$$A1(k=2).A2(k=2) > \rho.A1(k=1).A2(k=1)$$

and, in the cases b) and c) above, eliminate the element for k=2 if the inequality is verified.

This list of possibilities of comparisons to eliminate the multiple paths is not restrictive. In particular, the comparison can be made on the squares and the cubes of the products or of the sums of the operators. In the example described; it is the possibility c) that was chosen because it makes it possible to have a better 'contrast' than the possibilities a) and b), i.e. the comparison relates to values that are easier to distinguish from one another. Compared with comparisons carried out on the squares or the cubes of the operators, the possibility c) has the advantage of the simplicity of the computations.

The description of FIG. 5 stopped with the computer 6. A circuit 7 with registers makes it possible to store the operators A1(k) and A2(k) relating to each salvo. Two multiplier circuits 8, 9 obtain the products such as respectively:

$$A1(k=2).A2(k=2)$$

and $$\rho.A1(k=1).A2(k=1)$$

or more generally:

$$A1(k').A2(k')$$

and $$\rho.A1(k).A2(k)$$

where k corresponds to an element received by direct path and where k' is greater than k.

A subtractor circuit 10 carries out the operation:

$$A1(k').A2(k') - \rho.A1(k).A2(k)$$

and the result of the subtraction is compared with the value 0 in a zero comparator 11. If A1(k'). A2(k')−ρ.A1(k).A2(k) is positive, the element corresponding to the value k' is eliminated in a register 12 that receives all the values k at its input and thus delivers only the values $k_v$ for which the processing considers that they refer to elements received by direct paths.

FIG. 5 has been described in the form of electronic circuits to facilitate the understanding of the various stages of the process. In fact, downline from the circuits 1 and 2 according to FIG. 5, the entire processing is carried out by a microcomputer specifically programmed for this purpose.

The invention is not limited to the example described and its above-mentioned alternatives. In particular, the correction can be carried out in a defined window, in a conventional way, depending on the operating conditions. Thus, if we consider the minimum and maximum distances between which the responder stations are likely to be placed, and if we consider the response time of these stations, an element will be taken into account only, for example, if its distance Cd lies between 900 and 4500 in the device which has been just described where the 16 recurrences of a salvo comprise 5000 range bins distributed over 2.5 ms, the starting point of a recurrence being the instant of interrogation relating to this recurrence. In fact, a window of this kind is envisaged in the hardware that has been used for the present description but, since this window is not specific to the invention, it has neither been shown in FIG. 5, nor described, so as to facilitate the description of the invention proper.

In the same way, the processing operation has been described with reference to two reception channels, a sum channel and a difference channel. This operation can also be implemented with more than two channels. The processing of each channel will remain equivalent to the processing operations carried out on two channels up to the circuit 7 according to FIG. 5 but, thereafter, instead of carrying out for example, a comparison of the inequality checking type $$A1(k').A2(k') > \rho.A1(k).A2(k)$$

with k'>k, it will be necessary to verify the inequality:

$$A1(k').A2(k') \ldots Am(k') > \rho.A1(k).A2(k) \ldots Am(k)$$

where m is the number of channels to be considered, with m as an integer greater than 2.

It must also be noted that, in the event of the application of the invention to a radar or an altimeter with elements each constituted by a pulse returning after one or more reflections, the presence detector, such as the detector 2 according to FIG. 5 could, on the basis of the signals such as a1, a2, provide the signals a1', a2' directly in the form of a numerical value of the amplitude of each pulse. Indeed, the number $N_{ie}$ of pulses per element is then reduced to 1, so much so that the detector 2 does not have to carry out an integration of energy on the duration of the element and there is no longer any reason for the presence of the divider circuit since the division would be a division by 1. In this kind of application, a recurrence will be regarded as valid if and only if it does not have a width greater than that of the interrogation pulses.

What is claimed is:

1. A method for the processing of the multiple paths in a transceiver station designed to send salvoes of recurrent interrogations and, following a given interrogation, to receive responses in the form of elements, formed by at least one pulse, on n distinct channels, with n as an integer greater than 1, during a given period of time, called a recurrence, whose point of origin in time is the instant of transmission of the given interrogation and whose duration is the time interval between two successive interrogations in the salvo, this method consisting, in relation to each salvo, in considering only the recurrences where each received element is identified without ambiguity, selecting only the first of the recurrences and, among the following recurrences, only those having the same number of elements as the first recurrence, carrying out a classification, by order of appearance, of the elements in the recurrences selected, taking a measurement of the energy of each element related to the total duration of the pulses of the element, computing a normalized variance type of dispersion of the energy values on all the elements having the same classification, and doing so for each channel, and comparing the dispersion values so as to consider, as valid, only the first element of the classification and, among the other elements of the classification, only those which, on all the n channels, have dispersion values similar to those of the first one.

2. A method according to claim 1, applied to an IFF interrogator station having an antenna with two reception channels and with elements comprising more than one pulse, this method consisting in assessing the ambiguity with respect to the possibility, during the almost simultaneous reception of two elements, of defining that one of these two elements to which a given pulse belongs.

3. A method according to claim 2, that consists in taking the product of the dispersion values of the two channels for each of the elements of a same classification and in making the comparison of the dispersion values on the products thus obtained.

* * * * *